July 13, 1943.  J. F. HAUNTY  2,324,080
CLUTCH CONTROL MECHANISM
Filed July 26, 1941
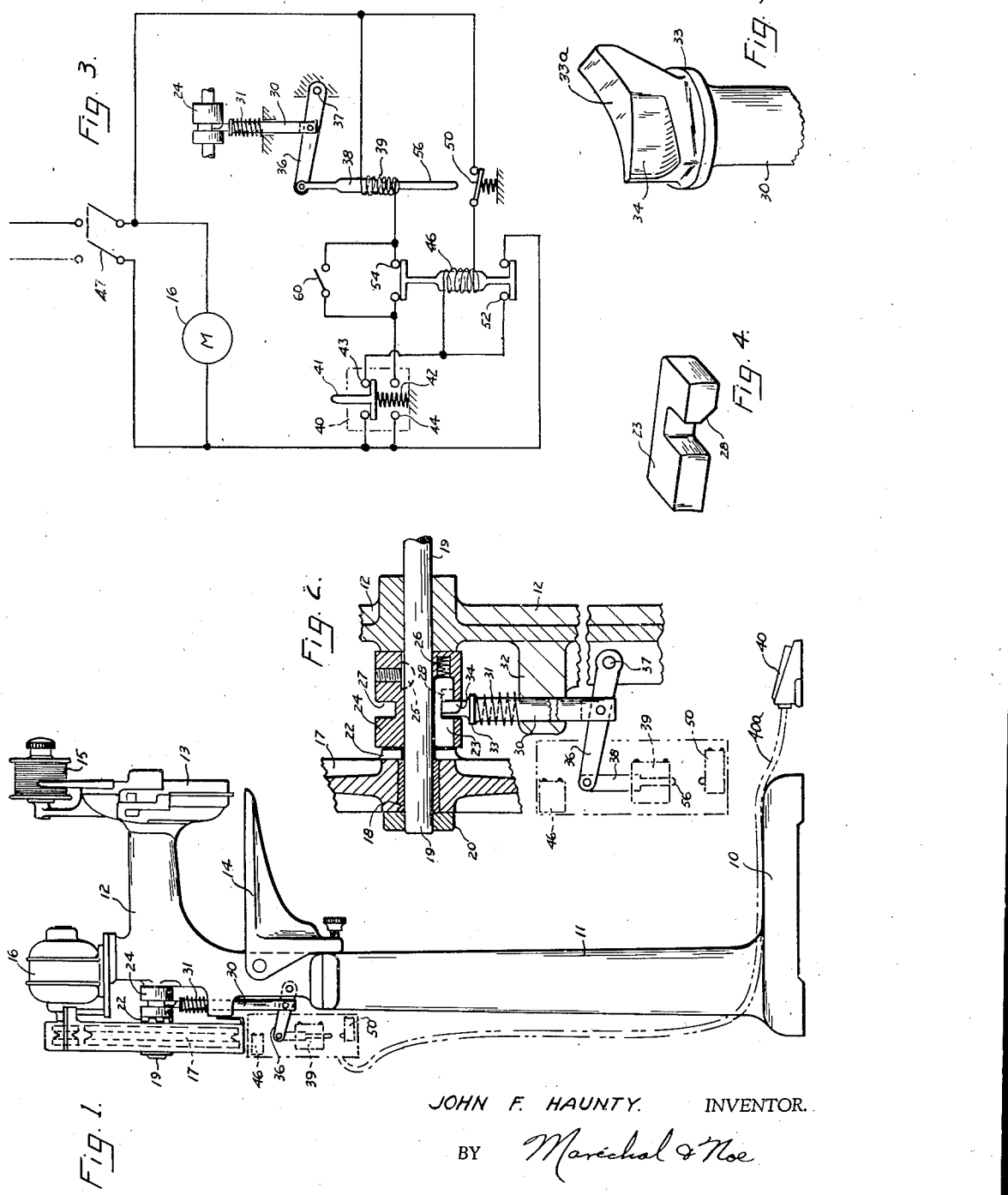
JOHN F. HAUNTY, INVENTOR.
BY Marechal & Noe
ATTORNEYS

Patented July 13, 1943

2,324,080

UNITED STATES PATENT OFFICE 2,324,080

CLUTCH CONTROL MECHANISM

John F. Haunty, Dayton, Ohio, assignor to Harris-Seybold-Potter Company, Cleveland, Ohio, a corporation of Delaware Application July 26, 1941, Serial No. 404,222

9 Claims. (Cl. 192—40)

This invention relates to control mechanism for use with power operating machinery for preventing undesired or repeat cycles of operation thereof.

It is the principal object of the invention to provide a simple and effective control mechanism for a power machine such as a wire stitching device which assures that only a single operation of the machine will occur upon each actuation thereof and that undesired and possibly dangerous repeat operations will be effectively prevented.

It is a further object to provide such a control mechanism for use with an operator controlled power machine in which failure of the operator to release the control handle or pedal cannot result in undesired or dangerous repeat operations of the machine.

It is a further object to provide an electrical control arrangement for use in conjunction with the clutch mechanism or other control member of the power machine so that the clutch is normally disengaged and can be engaged under control of the operator for only a single cycle of operation of the machine.

Other objects and advantages will be apparent from the following disclosure, the accompanying drawing, and the appended claims.

In the drawing,

Fig. 1 is a view in side elevation showing the control mechanism of this invention incorporated in a wire stitching machine;

Fig. 2 is a fragmentary view partially in section and partially schematic showing the mechanism and the arrangements for effecting actuation thereof, in accordance with this invention;

Fig. 3 is schematic and wiring diagram showing the electrical circuits incorporated in the control mechanism; and Figs. 4 and 5 are enlarged detail perspective views of the clutch jaw control parts.

Referring to the drawing which discloses a preferred embodiment of the invention, for purposes of illustration a wire stitching mechanism has been shown as the power operating machine, and although not so limited in its application, the invention has been developed particularly for such a machine, and for purposes of illustration will be described in relation thereto.

As shown, the machine comprises a base 10, an upwardly extending pedestal 11, and a head 12 supporting the stitching mechanism 13 in overhanging relation to a clincher arm 14. A spool of wire 15 is carried in the position shown and is arranged to be supplied to the stitching mechanism for operation thereof in the usual manner, providing for the stitching or fastening of sheets of paper, fiber, metal or like material, with a separate stitch being formed for each actuation of the machine.

A drive motor 16 operates through suitable interconnections to rotate a driven pulley 17 which is suitably weighted to serve as a fly wheel. The fly wheel is thus constantly driven during operation of the machine and is rotatably supported by sleeve bearing 18 which is freely journaled on shaft 19 and retained thereon by means of collar 20. In the arrangement shown a separate stitch is formed for each revolution of the drive shaft 19 of the stitching mechanism.

One face of the fly wheel 17 is formed with a plurality of clutch jaws 22 and is arranged to have driving engagement with an axially movable clutch jaw 23 which is slidably received in carrier member 24. The carrier is keyed to shaft 19 as shown at 25 and carries a spring 26 which urges clutch jaw 23 toward engaging position. Carrier member 24 is formed with a peripheral groove 27 which extends radially inwardly to the point where it intersects movable jaw 23 which is formed with a cooperating groove having a bevel lead-in portion 28 adapted to serve as a cam to cause axial movement of the clutch jaw. The clutch control member, formed as an operating pin 30 is non-rotatably supported for radial movement into and out of the grooves and is normally urged thereinto by means of a compression spring 31 working against a fixed part of the frame 32 and engaging a collar 33 on the pin. At its upper end, the pin carries an operating portion 33a of a width to be received within groove 27 and of greater arcuate extent than clutch jaw 23. The leading end of this member 33a is beveled as shown at 34 and is adapted when released to move into the groove 27 and as the shaft rotates, to engage its beveled portion against the beveled surface 28 of clutch jaw 23 to effect the withdrawal thereof from driving engagement with jaw 22. As soon as such disengagement is effected, rotation of shaft 19 stops, the member 33a being of sufficient arcuate extent to maintain its engagement with clutch jaw 23 for any small fraction of a revolution of overrun which may occur. The stitching mechanism is thus rendered inoperative and is maintained in such condition until the withdrawal of pin 30, enabling spring 26 to move clutch jaw 23 to re-establish driving connections for a subsequent cycle of operation.

In order to cause withdrawal of the clutch pin and the consequent engagement of the clutch jaws, the pin is pivotally connected at its lower end to a lever 36, suitably fulcrumed at 37, and attached at its opposite end to the operating plunger 38 of a solenoid device indicated at 39. Thus it will be clear that upon energization of solenoid 39, it will draw its armature downwardly, and such movement will through the lever system above described, effect downward withdrawal of the clutch operating pin 30 and thereby establish direct driving connections from the fly wheel to shaft 19. Similarly, upon release of said solenoid, the spring 31 will cause the upward lifting of the pin 30, together with the armature of the solenoid, and the beveled surface 34 of the operating pin will engage spiral cam surface 28, the movable clutch jaw will be withdrawn and the drive thus disconnected with the drive shaft 19 and the stitching mechanism in a definite and predetermined position, preferably at the end of one cycle of operation and in preparation for the next.

Control of the solenoid and the resulting clutch operation is effected by suitable electrical control means. Such means incorporates the operator controlled switch 40, shown in the form of a treadle operated device connected to the machine through a flexible cable 40a, it being understood that the control may be actuated by the operator, or in any other independent manner, as desired. Switch 40 incorporates a movable contact member 41 which is normally urged upwardly by a spring 42 to close the circuit across back contacts 43. When depressed by the operator, or otherwise, the circuit across the back contacts is opened, and a separate circuit across front contacts 44 is established.

A relay 46 is provided having an armature and an operating coil which is included in the circuit of back contacts 43 so that when the main control switch 47 is closed, a circuit is completed through back contacts 43 of switch 40, to cause the energizing of this relay. A spring closed switch 50 included in this circuit remains closed in the absence of the actuation of solenoid 39.

When relay 46 is energized, it closes its contacts 52 to establish a holding or locking circuit around contacts 43, and thus retains its energizing circuit notwithstanding the opening of switch contacts 43. The relay likewise closes its contacts 54 which are included in the energizing circuit to solenoid 39, and a circuit is thus prepared for the energization of solenoid 39. This circuit is not completed however because it is broken at the front contacts 44 of the operator controlled switch 40, and hence no energization of solenoid takes place until the depression of the switch member 41 under control of the operator.

When energized, the armature of solenoid 39 is drawn downwardly and is provided with an extension 56 which is positioned in line with the spring switch 50, and suitably spaced therefrom so that during initial movement of the armature, switch 50 remains closed, but toward or substantially at completion of such movement, extension 56 engages switch 50 and thus opens the circuit to relay 46. This de-energizes the relay, which then opens its contacts 52 and 54, and the energizing circuit for solenoid 39 is interrupted, whether or not the operator controlled switch 40 remains in closed position across its contacts 44.

The operation of the control mechanism it is believed will be clear from the foregoing. Having closed main line switch 47, motor 16 is energized, to cause operation of fly wheel 17, but the drive to the stitching mechanism is disconnected at the clutch 22, 23. Upon closing of the main line switch, relay 46 was immediately energized through back contacts 43 of the operator controlled switch, and likewise immediately established a self-holding or locking circuit through its contacts 52. In this condition the mechanism is prepared for operation, and when switch 40 is moved to its down position, the energizing circuit for solenoid 39 is completed, its armature is drawn downwardly, the clutch pin 30 is withdrawn, and the spring 26 causes engagement and driving interconnection between the fly wheel and the driven shaft so that the stitching mechanism begins a cycle of operation in the forming of a stitch. Immediately upon actuation of the solenoid, and the withdrawal of the clutch pin 30, the energizing circuit for relay 46 was broken at spring switch 50, and the solenoid was thus de-energized and clutch pin 30 allowed to return under the action of spring 31. This action takes place shortly after the withdrawal of the pin, and before a rotation of the carrier member 24 has been completed. Thus pin 30 rides upon the groove 27 until it engages the cam surface of jaw 23, and promptly thereupon it causes the disengagement of the clutch so that the drive is completely disconnected at a predetermined point. Thus only a single cycle of operation of the machine, as represented by a single rotation of shaft 19, can be effected for each operation of the operator controlled switch 40, and the failure on the part of the operator to release that switch cannot result in multiple or repeat cycles of operation of the machine.

In some cases it may be desirable to have the machine operate for a number of cycles, and in such event the non-repeat feature may be readily eliminated by the provision of auxiliary switch 60 which is connected in shunt across contacts 54 of relay 46. With switch 60 closed, the energizing circuit for solenoid 39 is controlled entirely from the operator switch 40, and the solenoid will remain energized as long as such operator switch is held in a closed position. Such control may be included if desired, and the provision of the simple switch control as shown provides for securing either the continuous operation or the non-repeat operation, as may be desired.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. Control mechanism for a power machine of the character described having a clutch mechanism in the drive for said machine, comprising a clutch control member movable with respect to said clutch from an initial position where said clutch is disengaged to an operative position provided for engagement thereof, a solenoid to effect said movement of said clutch control member, means including a control circuit for energizing said solenoid under control of the operator, means operated by movement of said clutch control member for interrupting said control circuit upon completion of said movement to de-energize said solenoid, and means for restoring said clutch control member to its initial position.

2. Control mechanism for preventing repeat operations of an operator controlled power machine comprising a control member movable from a normal to an actuated position for initiating a cycle of operation of said power machine, electrically operated means for moving said control member to its said actuated position, a circuit for said electrically operated means, an operator controlled switch for closing said circuit to energize said electrically operated means and to move said control member to its actuated position, and means actuated by movement of said control member to its said actuated position for de-energizing said electrical operating means independently of said operator controlled switch.

3. Control mechanism for preventing repeat operations of a power machine comprising a control member for controlling the drive to said power machine, means for normally urging said control member to position where the drive for said power machine is rendered inoperative, electrical means adapted to be energized for moving said control member to a position where said drive is rendered operative, a circuit for energizing said electrical means, an operator controlled switch for closing said circuit, and switch means actuated by said control member upon movement to its said operative position for opening said energizing circuit independently of said operator controlled switch to provide for return thereof to said inoperative position.

4. Control mechanism for preventing repeat operations of a power machine comprising a control member having a neutral position where said power machine is inoperative and an actuated position where said machine is operative, means for normally urging said control member to said neutral position, electrical means adapted to be energized for moving said control member to said actuated position, a circuit for energizing said electrical means, a relay having a switch in said energizing circuit, operator controlled switch means also in said energizing circuit, means for normally energizing said relay so that its contacts are closed and the circuit to said electrical means is under control of said operator controlled switch, and means actuated in response to movement of said control member by said electrical means for de-energizing said relay to cause the opening of said energizing circuit and the release of said control member to provide for its return to said neutral position.

5. Control mechanism for preventing repeat operations of a power machine comprising a member for controlling the drive of said power machine, means for normally urging said control member to a position where the drive for said power machine is rendered inoperative, electrical means adapted to be energized for moving said control member to a position where said drive is rendered operative, a circuit for energizing said electrical means, a relay having a switch in said energizing circuit, a two position operator controlled switch having back contacts for closing the circuit to said relay and having front contacts in said energizing circuit, and means actuated in response to movement of said control member to its operative position for de-energizing said relay to cause opening of said energizing circuit and release of said control member to provide for its return to said neutral position.

6. Control mechanism for preventing repeat operations of a power machine comprising a member for controlling the drive of said power machine, means for normally urging said control member to a position where the drive for said power machine is rendered inoperative, electrical means adapted to be energized for moving said control member to a position where said drive is rendered operative, a circuit for energizing said electrical means, a relay having a switch in said energizing circuit, a two position operator controlled switch having back contacts for closing the circuit to said relay and having front contacts in said energizing circuit, a holding circuit for said relay shunting said back contacts upon energization thereof, and means actuated by movement of said control member to its operative position for de-energizing said relay to cause the opening of said energizing circuit and release of said control member to provide for its return to said neutral position.

7. Control mechanism for assuring the stopping of a power machine at the end of each cycle of operation thereof comprising a control member movable from a neutral position where the drive for said machine is rendered inoperative at a predetermined point in the cycle of operation of the machine to an actuated position where said drive is rendered operative, means for normally returning said control member to said neutral position, a solenoid for actuating said control member to an operative position, an energizing circuit for said solenoid, a relay having contacts in said energizing circuit, an operator controlled switch also in said energizing circuit for completing the energization of said solenoid to render said drive operative at the beginning of a cycle of operation of said machine, and a switch in the circuit of said relay adapted to be opened in response to actuation of said control member to de-energize said solenoid and to provide for return of said control member to its said neutral position prior to completion of a cycle of operation of said power machine to render said drive inoperative upon completion of said one cycle of operation.

8. Control mechanism for assuring the stopping of a power machine having a clutch mechanism in its drive at the end of each cycle of operation thereof comprising a clutch control member movable from a neutral position where said clutch is disengaged at a predetermined point in the cycle of operation of the machine to an actuated position where said clutch is engaged for operation of the machine, means for normally returning said control member to said neutral position, a solenoid for actuating said control member to an operative position, an energizing circuit for said solenoid, a relay having a contact in said energizing circuit, an operator controlled switch also in said energizing circuit for completing the energization of said solenoid to cause engagement of said clutch at the beginning of the cycle of operation of said machine, and a switch in the circuit of said relay adapted to be opened in response to the actuation of said control member to immediately de-energize said solenoid and to provide for return of said control member to its neutral position prior to completion of a cycle of operation of said power machine to effect disengagement of said clutch upon completion of said one cycle of operation.

9. Control mechanism for the drive of a power machine comprising a control member movable from a neutral position where said drive is rendered inoperative to an actuated position where said drive is rendered operative, means for normally returning said control member to said neutral position, a solenoid for actuating said control member to an operative position, an energizing circuit for said solenoid, a relay having contacts in said energizing circuit, an operator controlled switch also in said energizing circuit for completing energization of said solenoid to cause actuation of said control member to render said drive operative, a switch in the circuit of said relay adapted to be opened in response to actuation of said control member to de-energize said solenoid and to provide for return of said control member to its neutral position prior to completion of a cycle of operation of said power machine, and additional switch means for shunting said relay contacts in said energizing circuit to provide for continuous cycles of operation of said power machine as desired.

JOHN F. HAUNTY.